US012589664B2

(12) United States Patent
Noormohammadi et al.

(10) Patent No.: US 12,589,664 B2
(45) Date of Patent: Mar. 31, 2026

(54) CHARGE COUPLER

(71) Applicant: Rivian IP Holdings, LLC, Plymouth, MI (US)

(72) Inventors: Nasser Noormohammadi, Long Beach, CA (US); Kevin Sze, Portland, OR (US); Tyler Jay Erikson, Torrance, CA (US); Travis Elliot Stewart, Carson, CA (US); Alexander Michael Kwan, Redondo Beach, CA (US); Kyle Robert Underhill, Los Angeles, CA (US); Kush Upreti, Irvine, CA (US); Ellen Marie Hilgersom, Santa Cruz, CA (US); Robin John Moore, Colchester (GB)

(73) Assignee: Rivian IP Holdings, LLC, Irvine, CA (US)

( * ) Notice: Subject to any disclaimer, the term of this patent is extended or adjusted under 35 U.S.C. 154(b) by 823 days.

(21) Appl. No.: 17/931,958

(22) Filed: Sep. 14, 2022

(65) Prior Publication Data

US 2024/0083269 A1 Mar. 14, 2024

(51) Int. Cl.
*B60L 53/16* (2019.01)
*H01R 13/70* (2006.01)
(52) U.S. Cl.
CPC ............ *B60L 53/16* (2019.02); *H01R 13/701* (2013.01)
(58) Field of Classification Search
CPC .............................. B60L 53/16; H01R 13/701
USPC ......................................................... 320/109
See application file for complete search history.

(56) References Cited

U.S. PATENT DOCUMENTS

| 5,698,122 | A | * | 12/1997 | Lubieniecki | ............. | B23K 9/32 |
| | | | | | | 219/137.31 |
| 7,087,327 | B2 | * | 8/2006 | Pearson | .............. | H01M 8/0494 |
| | | | | | | 429/432 |
| 7,534,065 | B2 | * | 5/2009 | Rejman | .................... | B25F 5/02 |
| | | | | | | 403/328 |

(Continued)

FOREIGN PATENT DOCUMENTS

| CN | 112389223 | B | * | 4/2024 | .............. | B60L 53/16 |
| EP | 2644442 | B1 | * | 4/2019 | .............. | B60L 53/16 |

(Continued)

OTHER PUBLICATIONS

Office Action on Appl. No. DE 102023122339.9 dated Nov. 18, 2025.

*Primary Examiner* — Suresh Memula
(74) *Attorney, Agent, or Firm* — Foley & Lardner LLP

(57) ABSTRACT

A charge coupler with integrated electrical and mechanical disconnect switching can include a first member. A charging coupler can include a first member and a second member. The second member can be coupled at a first end with the first member. A charging coupler can include a first switch disposed at the first member and operable to cause, in response to a movement of the second member to a first angle with the first member that engages the first switch, a charging device to electrically decouple the charging device from a vehicle. A charging coupler can include a second switch disposed at the first member and operable to cause, in response to a movement of the second member to a second angle with the first member that engages the second switch, the charging device to mechanically decouple the charging device from the vehicle.

16 Claims, 12 Drawing Sheets

(56)    References Cited

U.S. PATENT DOCUMENTS

| | | | | |
|---|---|---|---|---|
| 10,279,696 | B2 * | 5/2019 | Dow | B60L 53/65 |
| 11,691,523 | B2 * | 7/2023 | Jeong | B60L 53/16 |
| | | | | 320/109 |
| 2012/0126747 | A1 * | 5/2012 | Kiko | B60L 53/16 |
| | | | | 320/109 |
| 2013/0187600 | A1 * | 7/2013 | Gale | H02J 7/02 |
| | | | | 320/109 |
| 2013/0337669 | A1 * | 12/2013 | Najera | B60L 53/16 |
| | | | | 70/174 |
| 2022/0194237 | A1 | 6/2022 | Zhu et al. | |
| 2022/0281331 | A1 * | 9/2022 | Schafferhans | H01R 13/639 |

FOREIGN PATENT DOCUMENTS

| | | | | | |
|---|---|---|---|---|---|
| EP | 3763558 | A1 * | 1/2021 | | B60L 53/16 |
| JP | 2011234444 | A * | 11/2011 | | B60L 50/66 |
| JP | 2015-089285 | A | 5/2015 | | |
| KR | 200494858 | Y1 * | 1/2022 | | B60L 53/18 |
| KR | 102715399 | B1 * | 10/2024 | | H01R 13/74 |
| WO | WO-2025082561 | A1 * | 4/2025 | | H01R 13/629 |

* cited by examiner

100

130

110

105

135

120

115

125

200

1100

1200

Cause charging device to
electrically decouple charging device and vehicle          1205

Move at least one of
first member or second member to second angle          1210

Engage second switch at first member          1215

Cause charging device to
mechanically decouple charging device and vehicle          1220

CHARGE COUPLER

INTRODUCTION

Vehicles such as electric vehicles can be charged by a charging device. Operation of the charging device can transfer power to batteries of an electric vehicle.

SUMMARY

This technical solution is generally directed to a charge coupler. The technical solution can include a charge coupler with integrated electrical disconnect and mechanical disconnect switching. The technical solution has a technical improvement of deactivating a charging connection between a charging device and a vehicle to reduce inefficient electrical output at the point of connection between the charging device and the vehicle. The technical solution can include a mechanical device and an electrical switching circuit to sequentially disengage electrical and mechanical connections between the charging device from a vehicle connected to the charging device. The technical solution can include a handle or a portion of a handle of a plug of a charging device. The handle can include a mechanical structure to disconnect an electrical connection between a charging device and a vehicle before disconnecting a mechanical connection between the charging device and the vehicle.

At least one aspect is directed to an apparatus. The apparatus can include a charging coupler having a first member and a second member. The apparatus can include the second member coupled at a first end with the first member. The apparatus can include a first switch disposed at the first member and operable to cause, in response to a movement of the second member to a first angle with the first member that engages the first switch, a charging device to electrically decouple the charging device from a vehicle. The apparatus can include a second switch disposed at the first member and operable to cause, in response to a movement of the second member to a second angle with the first member that engages the second switch, the charging device to mechanically decouple the charging device from the vehicle.

At least one aspect is directed to a method of operating a charge coupler having a charge controller. The method can include moving at least one of a first end of a first member and a first end of a second member to a first angle, the second member coupled at a first end with the first member. The method can include engaging, in response to the moving to the first angle, a first switch disposed at a position at the first member. The method can include causing, in response to the engaging the first switch, a charging device to decouple the charging device from a vehicle. The method can include moving at least one of a first end of a first member and a first end of a second member to a second angle. The method can include engaging, in response to the moving to the second angle, a second switch disposed at the position at the first member. The method can include causing, in response to the engaging the second switch, the charging device to mechanically decouple the charging device from a vehicle.

At least one aspect is directed to a system. The system can include a charging coupler to connect a charger to a vehicle to deliver power between the charger and the vehicle. The charging coupler can include a latch to lock the charging coupler to the vehicle. The charging coupler can include a button configured to cause, responsive to a first level of actuation of the button, the charger to terminate delivery of power to the electric vehicle, and disengage, responsive to a second level of actuation of the button that is greater than the first level of actuation of the button, the latch to unlock the charging coupler from the vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for a charge coupler with integrated electrical disconnect and mechanical disconnect switching. The various concepts introduced above and discussed in greater detail below may be implemented in any of numerous ways.

Charging devices for an electric vehicle can transmit power or electricity to the vehicle as current. Further, charging devices can be developed according to one or more constraints that enforce compatibility with the charging device and multiple types of battery charging system of electric vehicles. However, charging devices may be susceptible to uncontrolled electrical transmission where a mechanical connection between a charging device and a vehicle is terminated without prior termination of an electrical connection between the charging device and the vehicle. Uncontrolled electrical transmission can include transmission by an air gap between a plug of a charging device and a charging port of an electric vehicle, and can result in performance degradation of an electric vehicle including reduction in battery life of the electric vehicle, reduction in useful life of charging circuits of the charging device or the electric vehicle, or reduction in charging efficiency of the charging device.

Aspects of this technical solution are directed to a mechanical structure of a charging device to sequentially disconnect an electrical connection and a mechanical connection between a charging device and an electric vehicle. The charging device can include a plug portion having multiple switches that can be sequentially engaged to provide instructions, signals, or otherwise cause a disconnect of an electrical connection and a mechanical connection in a particular order. For example, the plug portion can include a first elongated member and a second elongated member rotatably coupled to the first elongated member. The first elongated member can have a coupler mechanically attachable to an electric vehicle and can be rotatably attached to the second elongated member at a center thereof. During an operation to disconnect the plug portion from the electric vehicle, a user of the plug portion can apply pressure on an end of the first member and an end of the second member.

Figure 1:
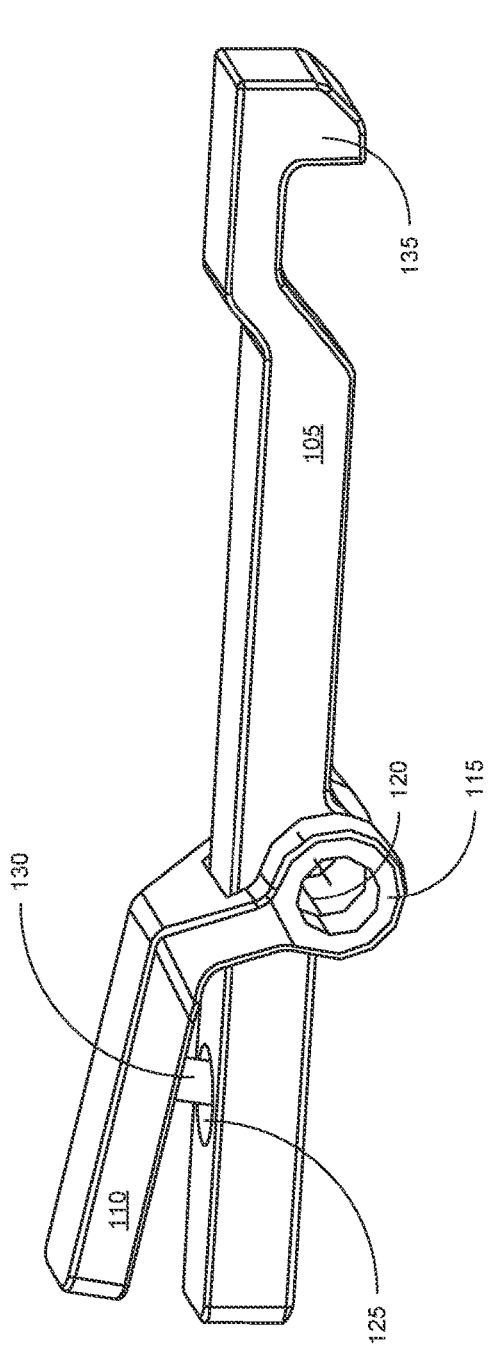
FIG. 1 depicts an actuation state of a charging coupler in accordance with present implementations.

FIG. 1 depicts an actuation state 100 of a charging coupler 101 in accordance with present implementations. As illustrated by way of example in FIG. 1, an example charging coupler 101 can include a first member 105, a second member 110, a hinge 115 of the second member 110, a hinge 120 of the first member 105, a receptacle 125, a protrusion 130, and a coupler 135.

The first member 105 can have a shape. For example, the shape of the first member 105 can be of elongated shape. The first member 105 can include or be formed of a rigid material. The rigid material can include a metal. The first member 105 can include one or more structures that integrate with the second member 110. The elongated shape can correspond to a rod, or block having a length dimension longer than one or more of a width dimension and a height dimension of the first member 105. The first member 105 can have a first end in the length dimension and a second end in the length dimension opposite to the first end. The first member 105 can have a central portion disposed in the length dimension between the first end and the second end. The first member 105 can include the hinge 120 disposed at the central portion of the first member 105. The hinge 120 can define an opening along a first axis through one or more sides of the first member 105, for example. The hinge 120 can couple with the hinge 115 of the second member 110. The first member 105 can include the coupler 135 located at or integrated into the first end of the first member 105. The first member 105 can include the receptacle located at or integrated into the first member 105 at a position between the central portion of the first member 105 and the second end of the first member 105, for example. The receptacle 125 can define an opening along a second axis through the position and through one or more of a top and a bottom of the first member 105. The opening of the receptacle can extend through the first member to provide clearance for movement or rotation, for example, of the protrusion into the receptacle.

The second member 110 can have an elongated shape and can comprise a rigid material. The rigid material can correspond to the rigid material of the first member 105, and the second member 110 can have a length less than the length of the first member 105. The elongated shape can correspond to a rod, or block having a length dimension longer than one or more of a width dimension and a height dimension of the second member 110 can. The second member 110 can have a first end in the length dimension and a second end in the length dimension opposite to the first end. The second member 110 can have a central portion disposed in the length dimension between the first end and the second end. The second member 110 can include the hinge 115 disposed at the first end of the second member 110. The hinge 115 can include a round structure to facilitate rotation of the second member 110 with respect to the first member 105. The round structure can include an opening along a first axis through one or more sides of the first member 105, for example. The round structure can include two guide structure each disposed on opposite sides of the first member 105 along the first axis through one or more sides of the first member 105, for example. The hinge 120 can couple with the hinge 115 of the second member 110. The second member 110 can include the protrusion 130 disposed at a central portion of the second member 110 and extending from a bottom surface of the second member 110. The protrusion can have an elongated structure at any angle, including a perpendicular angle, to a length dimension of the second member 110, and can have one or more of a cylindrical or polygonal structure, for example. The central portion of the second member 110 can be aligned with the receptacle 125 of the first member 105 along an axis corresponding to a height dimension. The protrusion 130 can include an electrically conductive material, and can be electrically isolated from the second member by an insulating material or cap material integrated into the protrusion at one or more points of connection with the second member 110. For example, an insulating material can include a plastic material, a polymer material, an insulating tape, or any combination thereof.

The receptacle 125 and the protrusion 130 can be at least partially separated from one another in the actuation state 100. The protrusion 130 can be positioned at least partially outside the receptacle in the actuation state 100 in which the first member 105 and the second member 110 are rotated to a position including a gap between those two structures.

For example, in response to the application of the pressure, the first member 105 and the second member 110 can rotate toward each other toward a configuration in which the first elongated member and the second elongated member are in contact with each other and parallel to each other. The second member 110 can engage a first electrical switch 710 in the first member when the pressure applied to the plug portion results in a first angle between the first elongated member and the second elongated member. The first electrical switch 710 can disengage an electrical connection between the charging device and the electric vehicle 765 by causing the transmission of a stop charge signal to the charging device 705. The stop charge signal can refer to or include a signal that indicates to the charging device 705 to terminate or stop the delivery of power from the charging device 705 to the electric vehicle 765. The second member 110 can engage a second electrical switch 715 in the first member 105 when the pressure applied to the plug portion results in a second angle between the first elongated member and the second elongated member. The second angle can be an angle indicating that the first member 105 and the second member 110 are more parallel than a relative orientation with respect to the first angle. The second electrical switch 715 can disengage the mechanical connection between the charging device 805 and the electric vehicle 765 by causing the transmission of a signal to the charging device 805. The signal can be a proximity signal, which can refer to a signal transmitted to a charging device 805 to disconnect one or more physical or mechanical components from an electrical 765. For example, a proximity signal can cause a charging device 805 to mechanically disconnect from an electric vehicle 765. This technical solution can provide a technical improvement including operation with higher electrical efficiency while maintaining compatibility with potential mechanical and electrical configurations of charging and battery structures of multiple electric vehicles.

For example, the rotation can include movement of a second end of the second member 110 toward the first member 105, the second end of the second member 110 distal to the first end of the second member 110. The rotation to the first angle causing the first switch 710 to engage, the second switch 715 being disengaged. The rotation to the second angle causing the first switch 710 to engage, and causing the second switch 715 to engage. For example, the first member 105 can have a first end mechanically attachable with the charging device 805. For example, the second member 110 electrically connectable with the charging device 805 by the second switch 715. For example, the apparatus can include a protrusion disposed on the second member 110 and extending in a direction perpendicular to the second elongated shape, the protrusion 130 moveable, in response to one or more of the rotation to the first angle and the rotation to the second angle, at least partially surrounded by a receptacle 125 defining an opening in the first member 105. For example, the rotation of the second member 110 to the first angle can include a movement of a protrusion 130 disposed on the second member 110 into a position at least partially surrounded by a receptacle 130 defining an opening in the first member 110. The rotation of the second member 110 to the second angle can include a movement of a protrusion 130 disposed on the second member 110 into a position at least partially surrounded by a receptacle 130 defining an opening in the first member 105. For example, the first level of actuation can correspond to a rotation of a first member 105 including the button 615 to a first angle, and the second level of actuation corresponding to a rotation of the first member 105 to a second angle different from the first angle. The button 615 can be moveable, responsive to one or more of the first level of actuation and the rotation to the second angle, at least partially surrounded by a receptacle 125 defining an opening in the first member.

Figure 2:
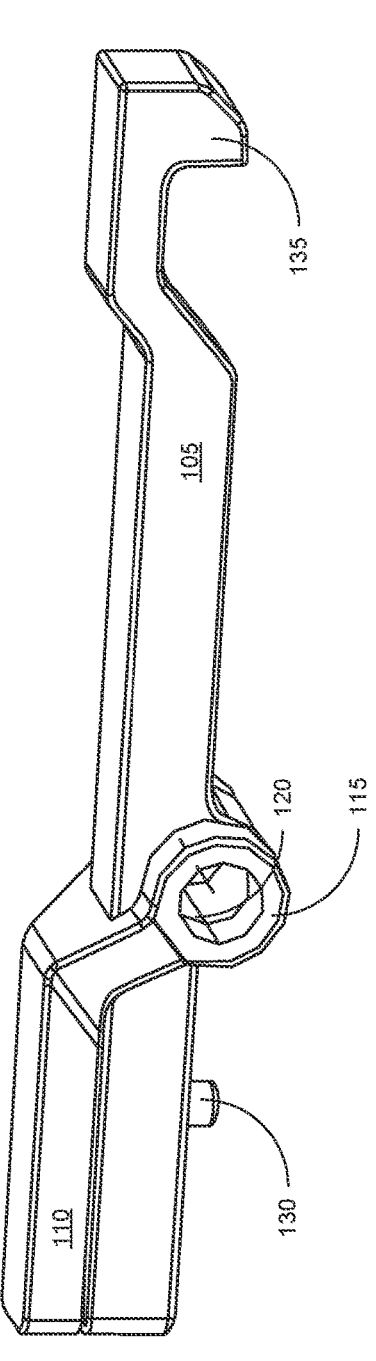
FIG. 2 depicts an actuation state of a charging coupler in accordance with present implementations.

FIG. 2 depicts an actuation state 200 of a charging coupler 101 in accordance with present implementations. As illustrated by way of example in FIG. 2, the charging coupler 101 can include the first member 105, the second member 110, the hinge 115, the receptacle 125, the protrusion 130, and the coupler 135. The receptacle 125 and the protrusion 130 can be at least partially inserted into or through the receptacle 125 in the actuation state 200. The protrusion 130 can be positioned at least partially within the receptacle in the actuation state 200 in which the first member 105 and the second member 110 are rotated to a position including a gap between those two structures.

Figure 3:
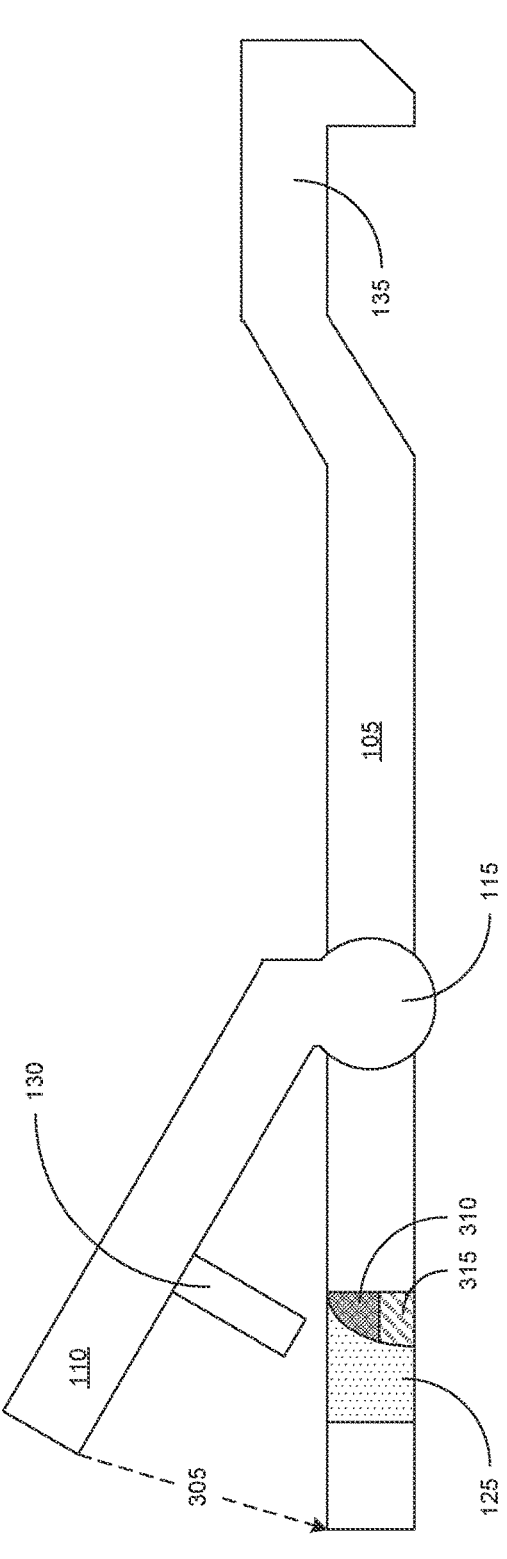
FIG. 3 depicts a cross-sectional view of an actuation state of a charging coupler in accordance with present implementations.

FIG. 3 depicts a cross-sectional view 300 of an actuation state of a charging coupler 101 in accordance with present implementations. As illustrated by way of example in FIG.

Figure 7:
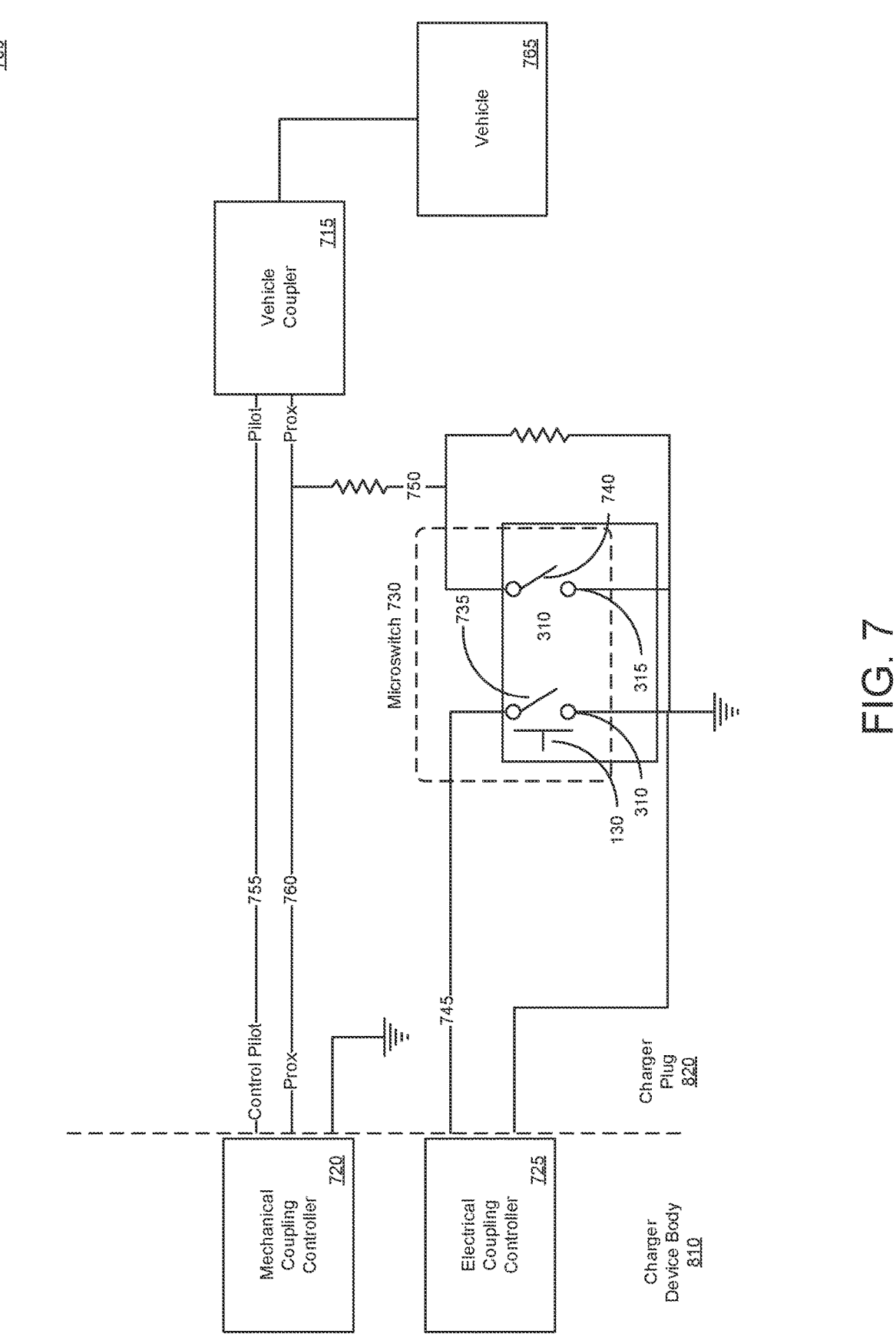
FIG. 7 depicts a circuit corresponding to a charging coupler in accordance with present implementations.

3, the charging coupler 101 can include the first member 105, the second member 110, the hinge 115, the receptacle 125 the protrusion 130, the coupler 135, a first switch component 310, and a second switch component 315. The first member 105 and the second member 110 can be positioned relative to each other at angle 305. For example, the angle 305 can include any angle greater than zero as measured from the respective ends of the first member 105 and the second member 120 as depicted herein. For example, the angle 305 can include any acute angle that results in placement of the protrusion 130 out of contact with the first switch component 310 and the second switch component 315. The first switch component 310 can close a first circuit by contact with or proximity to the protrusion 130, and an example is depicted in FIG. 7. The second switch component 315 can close a second circuit by contact with or proximity to the protrusion 130 distinct from the first circuit associated with the first switch component 310, and an example is depicted in FIG. 7.

The first switch component 310 and the second switch component 315 can be at least partially disposed within the receptacle 125. The first switch component 310 can include at least one physical structure that can be placed into contact with the protrusion 130. The physical structure of the first switch component 310 can include one or more of a sheet, plane, wire, protrusion, panel, block, or post, for example. The physical structure of the first switch component 310 can be contactable directly with the protrusion 130 to provide a mechanical contact and an and electrical connection between the first switch component 310 and the protrusion 130. The second switch component 315 can include at least one physical structure that can be placed into contact with the protrusion 130. The physical structure of the second switch component 315 can include one or more of a sheet, plane, wire, protrusion, panel, block, or post, for example. The physical structure of the second switch component 315 can be contactable directly with the protrusion 130 to provide a mechanical contact and an electrical connection between the second switch component 315 and the protrusion 130. The second switch component 315 can be electrically isolated from the first switch component 310 by one or more of an insulator layer and a gap disposed between the first switch component 310 and the second switch component 315. For example, electrical isolation can include a distance between two electrical components that inhibits or prevents flow of electrical energy from one of the components to the other.

The angle 305 can correspond to an angle between the first member 105 and the second member 110 resulting in separation of the protrusion 130 from the receptacle 125. At angle 305, the protrusion 130 can be fully separated from the receptacle 125, with the protrusion 130 fully outside the receptacle 125. At angle 305, the protrusion 130 can be physically and electrically isolated from the first switch component 310 and the second switch component 315. Thus, at angle 305, the charging coupler 101 can cause an electrical circuit coupled with the first switch component 310 to remain open, and can cause an electrical circuit coupled with the second switch component 315 to remain open.

Figure 4:
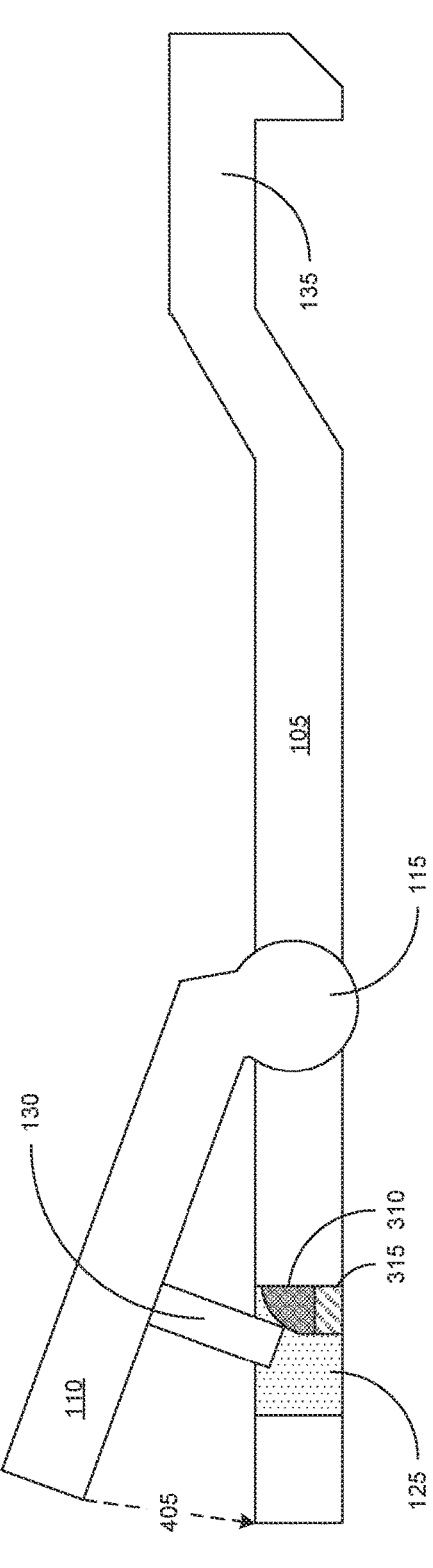
FIG. 4 depicts a cross-sectional view of an actuation state of a charging coupler in accordance with present implementations.

FIG. 4 depicts a cross-sectional view 400 of an actuation state of a charging coupler 101 in accordance with present implementations. As illustrated by way of example in FIG. 4, the charging coupler 101 can include the first member 105, the second member 110, the hinge 115, the receptacle 125, the protrusion 130, the coupler 135, the first switch component 310, and the second switch component 315. The first member 105 and the second member 110 can be positioned relative to each other at angle 405. The angle 405 can correspond to an angle between the first member 105 and the second member 110 resulting in at least partial placement of the protrusion 130 within the receptacle 125. For example, the angle 405 can include any acute angle less than the angle 305. At angle 405, the protrusion 130 can be at least partially disposed within the receptacle 125. At angle 405, the protrusion 130 can be physically and electrically connected with the first switch component 310, and can be physically and electrically isolated from the second switch component 315. Thus, at angle 405, the charging coupler 101 can cause an electrical circuit coupled with the first switch component 310 to close, and can cause an electrical circuit coupled with the second switch component 315 to remain open.

Figure 5:
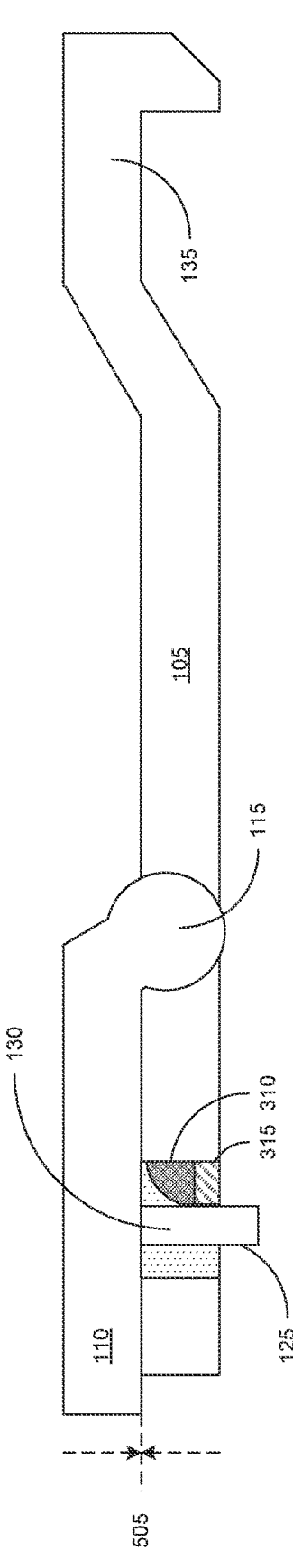
FIG. 5 depicts a cross-sectional view of an actuation state of a charging coupler in accordance with present implementations.

FIG. 5 depicts a cross-sectional view 500 of an actuation state of a charging coupler 101 in accordance with present implementations. As illustrated by way of example in FIG. 5, the charging coupler 101 can include the first member 105, the second member 110, the hinge 115, the receptacle 125, the protrusion 130, the coupler 135, the first switch component 310, and the second switch component 315. The first member 105 and the second member 110 can be positioned relative to each other at angle 505. The angle 505 can correspond to an angle between the first member 105 and the second member 110 resulting in at maximum placement of the protrusion 130 within the receptacle 125. For example, the angle 505 can include any acute angle less than the angle 405. At angle 505, the protrusion 130 can be fully disposed within the receptacle 125, and the first member 105 and the second member 110 can be substantially parallel or in contact with each other along a length dimension. At angle 505, the protrusion 130 can be physically and electrically connected with the first switch component 310 and the second switch component 315. Thus, at angle 505, the charging coupler 101 can cause an electrical circuit coupled with the first switch component 310 to remain closed, and can cause an electrical circuit coupled with the second switch component 315 to close.

Figure 6:
FIG. 6 depicts a system including a charging coupler in accordance with present implementations.

FIG. 6 depicts a system 600 including a charging coupler 101 in accordance with present implementations. As illustrated by way of example in FIG. 6, the charging coupler 101 can include the first member 105, the second member 110, the hinge 115, the coupler 135, the first switch component 310, the second switch component 315, a charger plug 605, a switch controller 610, a button 615, and a charger cable 620. The charger cable 620 can transmit electrical power to an electric vehicle through the charger plug 605. The charger cable 620 can include one or more conduct channels, or wires, for example, and can be surrounded by an electrically insulating material on an external surface thereof.

The charger plug 605 can include a housing at least partially surrounding the charging coupler 101. The charger plug 605 can be moved into contact with a charging port of an electric vehicle, and can be mechanically attached to the electric vehicle by the coupler 135. The housing of the charger plug 605 can include one or more of metallic and insulator materials, and can include a plastic housing, for example. The button 615 can be integrated with the charger plug 605 and can be actuated by downward pressure. The downward pressure on the button 615 can cause the button 615 to move downward, and to move the first member 105 with respect to the second member 110. One or more of the first member 105 and the second member 110 can pivot along the hinge 115 or 120 to cause, for example, rotation of one or more of the first member 105 and the second member 110 relative to each other. The downward movement of the button 615 can cause movement of one or more of the first member 105 and the second member 110 to one or more of the angles 305, 405 and 505.

The switch controller 610 can transmit one or more control signals in response to actuation of one or more of the first member 105 and the second member 110. The switch controller 610 can include or operatively couple with, for example, the first switch component 310 and the second switch component 315. For example, the switch controller 610 can include a first electrical connection between a first input of the switch controller 610 and the first switch component 310, and can include a second electrical connection between a second input of the switch controller 610 and the second switch component 315. Thus, the switch controller 610 can receive input independently from each of the first switch component 310 and the second switch component 315 in response to contact with the protrusion 130, and can transmit one or more control signals responsive to contact with respective ones of the first switch component 310 and the second switch component 315. The switch controller 610 can include one or more logical or electronic devices including but not limited to integrated circuits, logic gates, flip flops, gate arrays, programmable gate arrays, and the like.

FIG. 7 depicts a circuit 700 in accordance with present implementations. As illustrated by way of example in FIG. 7, an example circuit 700 can include the first switch component 310, the second switch component 315, the switch controller 610, the button 615, a switch 705, a first electrical switch 710, a second electrical switch 715, a mechanical coupling controller 720, an electrical coupling controller 725, a vehicle coupler 730, an electrical disconnect channel 740, a control pilot channel 745, a proximity channel 750, a first resistor 755, and a second resistor 760. The circuit 700 can couple with a vehicle 765. The switch controller 610 can comprise the circuit 700.

The switch 705 can include an electrical device. The switch 705 can include a plurality of electrical switches. The switch 705 can include one or more micromechanical components to effect switching in response to actuation of the protrusion with respect to one or more of the first switch component 310 and the second switch component 315. The switch 705 can include the first electrical switch 710 and the second electrical switch 715 configured in a stack configuration. The stack configuration can include a combined switching path or single switching path for the first electrical switch 710 and the second electrical switch 715 to be closed by the movement of the protrusion 130. Both the first electrical switch 710 and the second electrical switch 715 can be closed by movement of the first member 105 and the second member 110 to place the protrusion in contact with one or more of the first switch component 310 and the second switch component 315. The first electrical switch 710 and the second electrical switch 715 can each include, for example, at least one transistor, electromechanical switch, or any combination thereof.

The mechanical coupling controller 720 can receive at least one input indicating a condition to decouple or deactivate a mechanical connection of the vehicle coupler 730 from the vehicle 765, and can execute at least one instruction to decouple or deactivate a mechanical connection between the vehicle coupler 730 and the vehicle 765. The mechanical coupling controller 720 can receive an input at the proximity channel (Prox) 750, in response to a closing of the second electrical switch 715. An actuation caused by the button 615 can cause the closing of the second electrical switch 715, subsequent to the closing of the first electrical switch 710. The closing of the second electrical switch 715 can cause a pull-down electrical response at the proximity channel 750. The mechanical coupling controller 720 can detect input at the proximity channel 750, including a pull-down current or voltage condition corresponding to the pull-down electrical response. The resistors 755 and 760 can be arranged and coupled in a voltage divider structure. A voltage at a node coupling the resistors 755 and 760 can be based on the resistance of both of the resistors 755 and 760 during a state in which the second electrical switch 715 is open. A voltage at a node coupling the resistors 755 and 760 can be based on the resistance of the resistors 755, while shorting the resistor 760, during a state in which the second electrical switch 715 is closed. In response to the mechanical coupling controller 720 detecting the pull-down condition at the proximity input 750, the mechanical coupling controller 720 can transmit a decoupling instruction to the vehicle coupler 730 to mechanically disconnect the charger plug 605 from the vehicle 765. The mechanical coupling controller 720 can include one or more logical or electronic devices including but not limited to integrated circuits, logic gates, flip flops, gate arrays, programmable gate arrays, and the like.

The electrical coupling controller 725 can receive at least one input indicating a condition to decouple or deactivate an electrical connection of the vehicle coupler 730 from the vehicle 765, and can cause or execute at least one instruction to decouple or deactivate an electrical connection between the vehicle coupler 730 and the vehicle 765. The electrical coupling controller 725 can receive an input at the electrical disconnect channel 740, in response to a closing of the first electrical switch 710. An actuation caused by the button 615 can cause the closing of the first electrical switch 710, prior to the closing of the second electrical switch 715. The closing of the first electrical switch 710 can cause a pull-down electrical response at the proximity channel 750. The electrical coupling controller 725 can detect input at the electrical disconnect channel 740, including a pull-down current or voltage condition corresponding to the pull-down electrical response. The electrical disconnect channel 740 can receive a high impedance (high Z) input during a state in which the first electrical switch 710 is open. The electrical disconnect channel 740 can receive a ground or low input during a state in which the first electrical switch 710 is closed. The electrical coupling controller 725 can include one or more logical or electronic devices including but not limited to integrated circuits, logic gates, flip flops, gate arrays, programmable gate arrays, and the like. Any electrical, electronic, or like devices, or components associated with the electrical coupling controller 725 can also be associated with, integrated with, integrable with, replaced by, supplemented by, complemented by, or the like, the mechanical coupling controller 720 or any component thereof.

The vehicle coupler 730 can receive a decoupling instruction to the vehicle coupler 730 to mechanically disconnect the charger plug 605 from the vehicle 765. The vehicle coupler 730 can include or be operatively coupled with one or more actuators or moveable or rotatable mechanical structures to mechanically disconnect the charger plug 605 from the vehicle 765. The vehicle coupler 730 can include one or more logical or electronic devices including but not limited to integrated circuits, logic gates, flip flops, gate arrays, programmable gate arrays, and the like.

One or more communication channels can include one or more of the electrical disconnect channel 740, the control pilot channel 745, and the proximity channel 750. The communication channels can include one or more digital, analog, or like communication channels, lines, traces, or the like. As one example, each of the electrical disconnect channel 740, the control pilot channel 745, and the proximity channel 750 includes at least one serial or parallel communication line among multiple communication lines of a communication interface.

Figure 8:
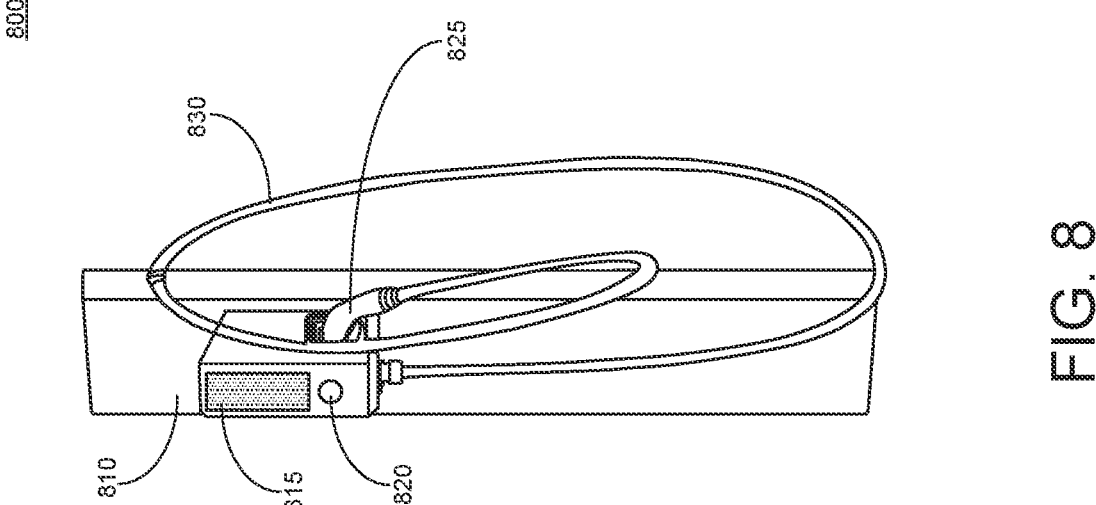
FIG. 8 depicts a view of a charging device, in accordance with present implementations.
Figure 8:

FIG. 8 depicts a view 800 of a charger device 805, in accordance with present implementations. As illustrated by way of example in FIG. 8, a view 800 can include the charger plug 605, the charger cable 620, a charger device body 810, a user interface display device 815, and an audio device 820. The charger device 805 can include one or more component or function depicted in FIGS. 1-7. The charger device body 810 can connect a charging infrastructure to the charger cable 620, and can provide a mounting for one or more of the charger plug 605, the charger cable 620, the user interface display device 815, and the audio device 820. The user interface display device 815 can include a display operable to present a user interface. The user interface display device 815 can include an electronic display. An electronic display can include, for example, a liquid crystal display (LCD), a light-emitting diode (LED) display, an organic light-emitting diode (OLED) display, or the like. The display device can be housed at least partially within the charging device 805. The audio device 820 can generate output audible at least within frequencies and volumes corresponding to the human sense of hearing. The audio device 820 can include one or more speakers integrated with or embedded within the charging device 805. The audio device 820 can generate voice, beeps, rings, tones, music, or any combination thereof, for example.

Figure 9:
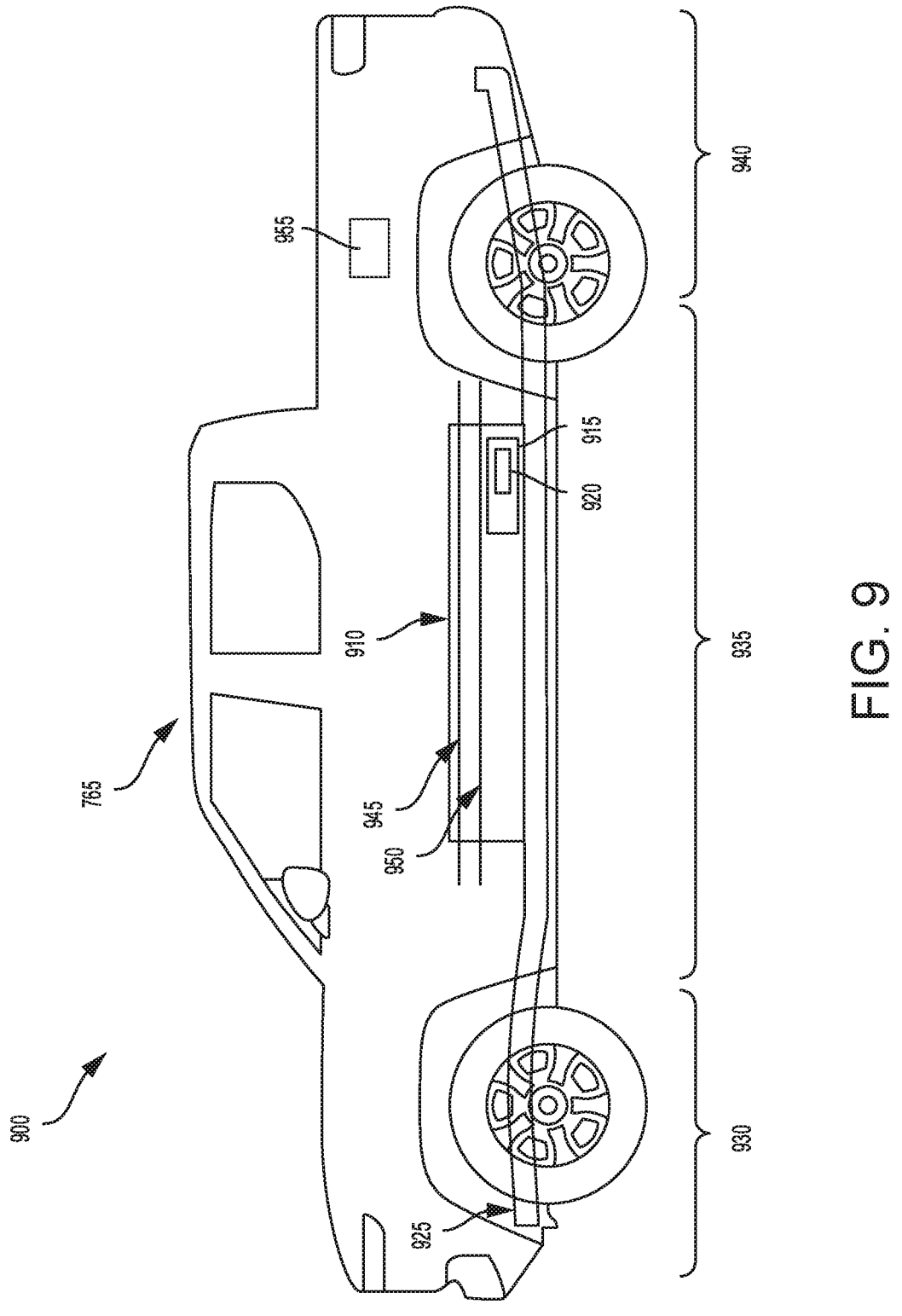
FIG. 9 depicts an electric vehicle, in accordance with present implementations

FIG. 9 depicts an example cross-sectional view 900 of an electric vehicle 765 installed with at least one battery pack 910. Electric vehicles 765 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 910 can also be used as an energy storage system to power a building, such as a residential home or commercial building. Electric vehicles 765 can be fully electric or partially electric (e.g., plug-in hybrid) and further, electric vehicles 765 can be fully autonomous, partially autonomous, or unmanned. Electric vehicles 765 can also be human operated or non-autonomous. Electric vehicles 765 such as electric trucks or automobiles can include on-board battery packs 910, battery modules 915, or battery cells 920 to power the electric vehicles. The electric vehicle 765 can include a chassis 925 (e.g., a frame, internal frame, or support structure). The chassis 925 can support various components of the electric vehicle 765. The chassis 925 can span a front portion 930 (e.g., a hood or bonnet portion), a body portion 935, and a rear portion 940 (e.g., a trunk, payload, or boot portion) of the electric vehicle 765. The battery pack 910 can be installed or placed within the electric vehicle 765. For example, the battery pack 910 can be installed on the chassis 925 of the electric vehicle 765 within one or more of the front portion 930, the body portion 935, or the rear portion 940. The battery pack 910 can include or connect with at least one busbar, e.g., a current collector element. For example, the first busbar 945 and the second busbar 950 can include electrically conductive material to connect or otherwise electrically couple the battery modules 915 or the battery cells 920 with other electrical components of the electric vehicle 765 to provide electrical power to various systems or components of the electric vehicle 765. The electric vehicle 765 can include a charge receptacle 955 compatible with the charger coupler 825. For example, the electric vehicle 765 can be electrically and mechanically coupled with the charging device 705 at the charge receptacle 955.

Figure 10:
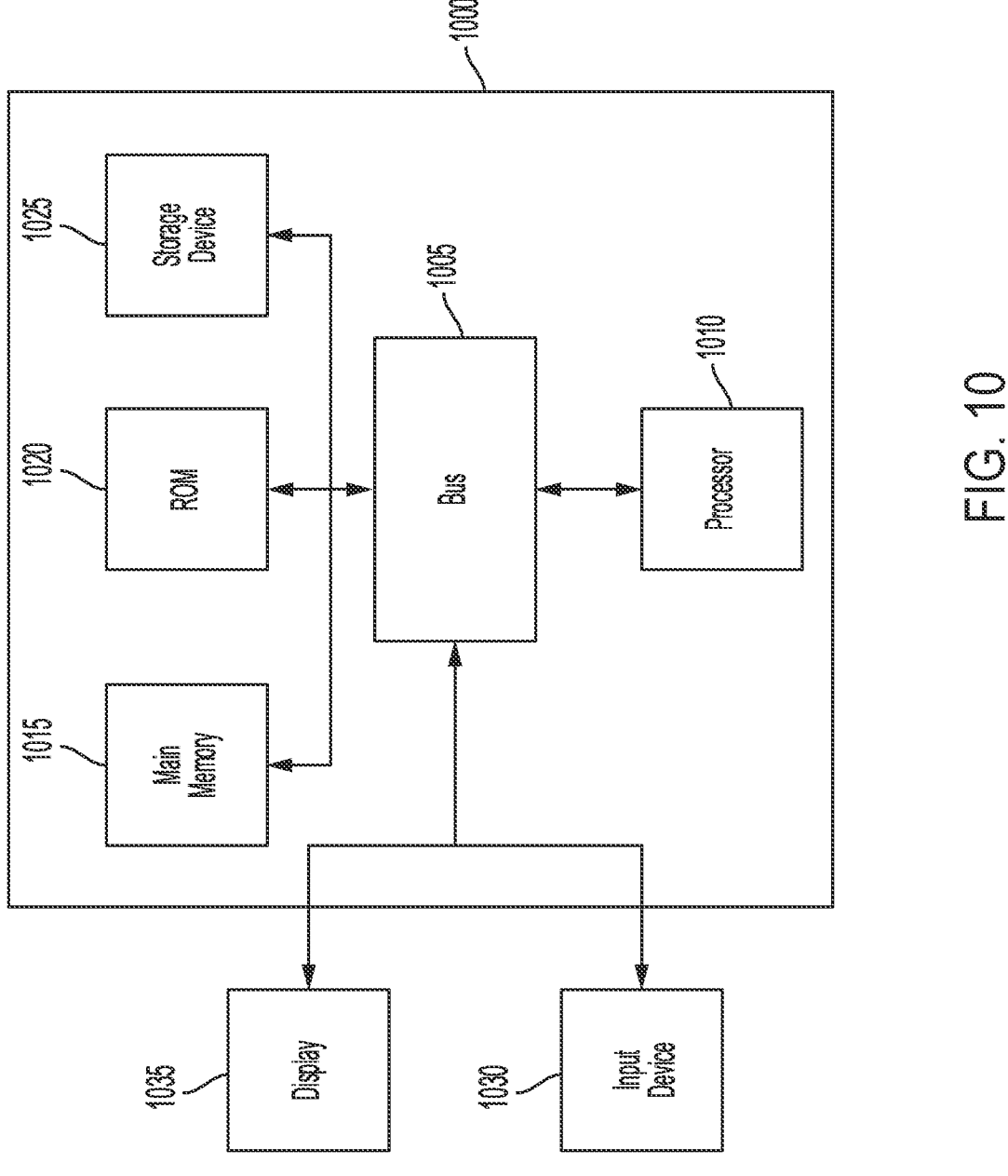
FIG. 10 is a block diagram illustrating an architecture for a computer system that can be employed to implement elements of the systems and methods described and illustrated herein.

FIG. 10 depicts an example block diagram of an example computer system 1000. The computer system or computing device 1000 can include or be used to implement a data processing system or its components. A data processing system can include or correspond to one or more of the switch controller 610 and the circuit 700 or any portion thereof. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus for processing information. The computing system 1000 also includes at least one main memory 1015, such as a random access memory (RAM) or other dynamic storage device, coupled to the bus 1005 for storing information, and instructions to be executed by the processor 1010. The main memory 1015 can be used for storing information during execution of instructions by the processor 1010. The computing system 1000 may further include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions.

The computing system 1000 may be coupled via the bus 1005 to a display 1035, such as a liquid crystal display, or active matrix display, for displaying information to a user such as a driver of the electric vehicle 765 or other end user. An input device 1030, such as a keyboard or voice interface may be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software. Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Figure 11:
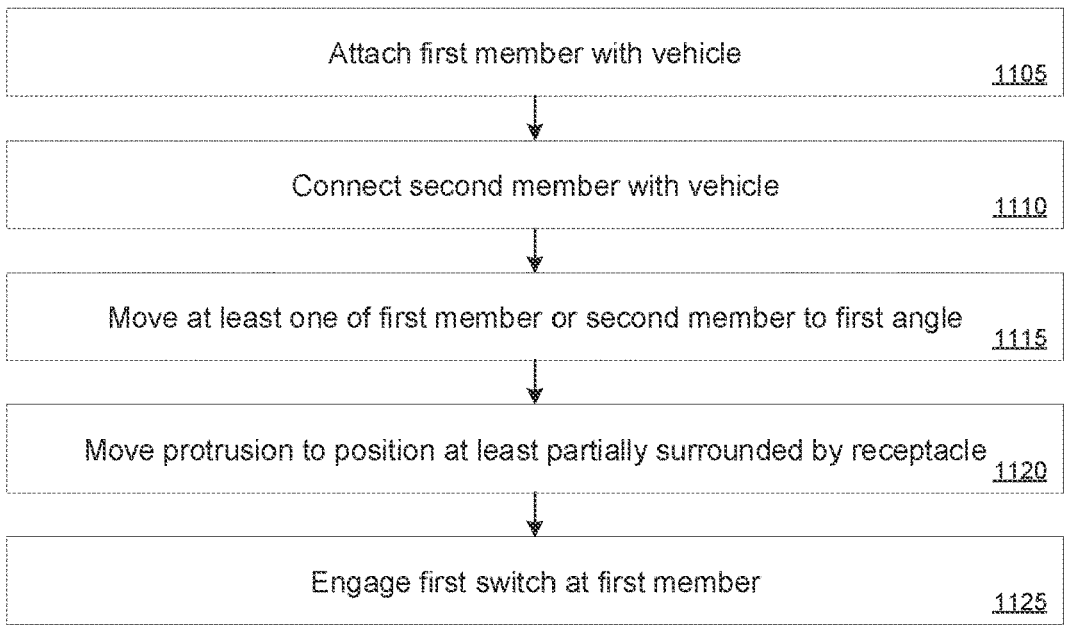
FIG. 11 depicts a method of operating a charge coupler with integrated electrical disconnect and mechanical disconnect switching.

FIG. 11 depicts a method 1100 of operating a charger plug 605 with integrated electrical disconnect and mechanical disconnect switching. At least one of the charging coupler 101, the electrical circuit structure 700, the charging device 805, the electric vehicle 765, and the architecture 1000 can perform method 1100 according to present implementations.

The method 1100 can include attaching a first member with a vehicle 765. (ACT 1105.) For example, attaching can include mating, locking, or affixing a fixing object or portion thereof with another physical object. For example, the method 1100 can include attaching, by a coupler 135 of a first member 105, the first member with a vehicle 765. For example, the method 1100 can include attaching, by a coupler 135 at a second end of a first member 105 distal to a first end of the first member, the first member with a vehicle 765.

The method 1100 can include connecting a vehicle 765 with a second member 805. (ACT 1110.) For example, the method 1100 can include electrically connecting a vehicle 765 with a second member 805. For example, electrically connecting can include attaching a conductive element with another conductive element to operatively couple electrical components.

The method 1100 can include moving at least one of a first member 105 or a second member 110 to a first angle. (ACT 1115.) For example, the moving to the first angle can include moving a protrusion 130 disposed on the second member 110 into a position at least partially surrounded by a receptacle 125 defining an opening in the first member. For example, moving can include rotating one or more of the first member 105 and the second member 110. For example, the second member 110 can be coupled at a first end with a central portion of the first member 105. For example, the method 1100 can include moving at least one of a first end of a first member 105 and a first end of a second member 110 to a first angle. For example, the method 1100 can include moving at least one of a first end of a first member 105 and a first end of a second member 110 to a first angle, the second member 110 coupled at a first end with the first member 105.

The method 1100 can include moving a protrusion 130 to a position at least partially surrounded by a receptacle 125. (ACT 1120.) For example, the method 1122 can include moving a protrusion 130 to a position at least partially surrounded by a receptacle 125 defining an opening in the first member 105, the protrusion 130 disposed on the second member 110 and extending in a direction perpendicular to the length of the second member 110. For example, the method 1100 can include moving a protrusion 130 to a position at least partially surrounded by a receptacle 125 defining an opening in the first member 105. For example, the method 1100 can include moving a protrusion 130 to a position at least partially surrounded by a receptacle 125 defining an opening in the first member 105, the protrusion 130 disposed on the second member 110 and extending in a direction perpendicular to the length of the second member 110.

The method 1100 can include engaging a first switch 710 disposed at the first member. (ACT 1125.) For example, the first switch 710 can be engaged and the second switch 715 can be disengaged at a rotation to the first angle. For example, the first switch 710 can be engaged and the second switch 715 can be engaged at a rotation to the second angle.

For example, the method 1100 can include engaging, in response to the rotating to the first angle, a first switch 710 disposed at the first member.

An example is discussed herein. A user can begin an operation to disconnect the charger plug 605 from the vehicle 765 by holding the charger plug 605 and actuating the button 615 by pressing the button with a thumb or other digit. The action of pressing the button 615 can cause the first member 105 to rotate at the hinge 120, and can cause the second member 110 to rotate at the hinge 115. The pressing of the button 615 can cause a disconnect of an electrical connection between the charger plug 605 and the electrical vehicle 765 within a predetermined time period before a disconnect of a mechanical connection between the charger plug 605 and the electrical vehicle 765. For example, the button 615 can cause an electrical connection between the charger plug 605 and the electrical vehicle 765 to be disconnected at least 50 ms before a mechanical connection between the charger plug 605 and the electrical vehicle 765 is disconnected. Thus, this disconnect can prevent inefficient electrical output including arcing cause by disconnect of a mechanical connection concurrently with or before disconnect of an electrical connection. Because both the electrical connect and the mechanical connection can be disconnected in predetermined sequence by actuation of the button 615, this technical solution provides the technical advantage of at least simplified structure and operation of disconnect of multiple vehicle systems by integrated switch and coupler structures.

Figure 12:
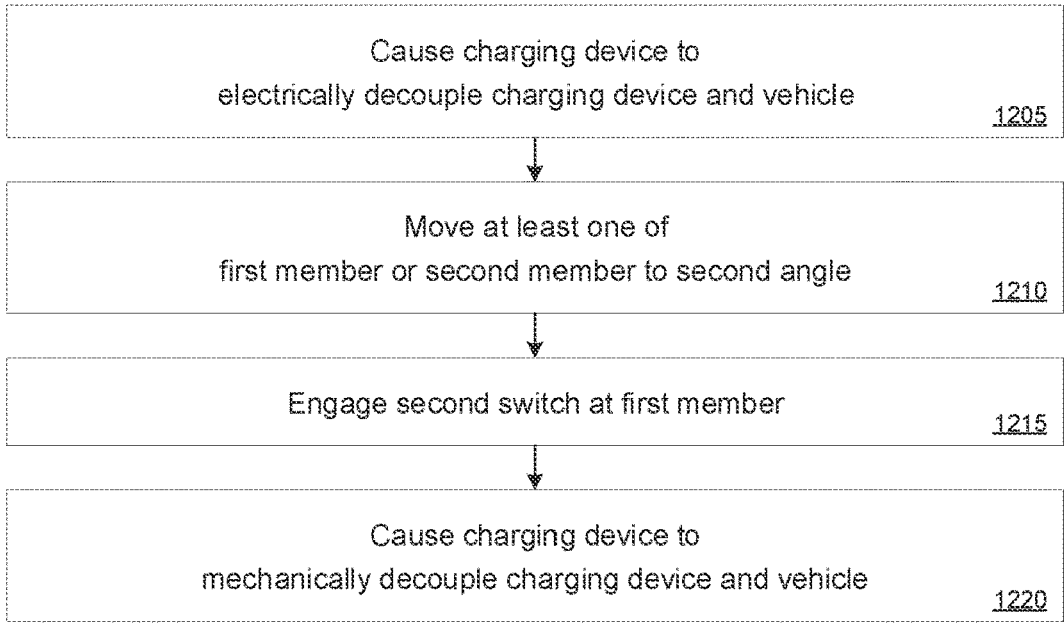
FIG. 12 depicts a method of operating a charge coupler with integrated electrical disconnect and mechanical disconnect switching.

FIG. 12 depicts a method 1200 of operating a charge coupler with integrated electrical disconnect and mechanical disconnect switching. At least one of the charging coupler 101, the electrical circuit structure 700, the charging device 805, the electric vehicle 900, and the architecture 1000 can perform method 1200 according to present implementations.

The method 1200 can include causing a charging device 805 to electrically decouple the charging device 805 and a vehicle 765. (ACT 1205.) For example, the first switch 710 can cause a circuit to instruct the charging device 805 or a component thereof to electrically decouple the charging device 805 and the vehicle 765. For example, the method 1200 can include causing, in response to the engaging the first switch 710, a charging device 805 to electrically decouple the charging device 805 and a vehicle 765.

The method 1200 can include moving at least one of a first member 105 or a second member 110 to a second angle. (ACT 1210.) For example, the moving to the second angle can include moving a protrusion 130 disposed on the second member into a position at least partially surrounded by a receptacle 125 defining an opening in the first member 105. For example, the moving can include rotating one or more of the first member 105 and the second member 110. For example, the method 1200 can include moving at least one of a first end of a first member 105 and a first end of a second member 110 to a second angle.

The method 1200 can include engaging a second switch 715 at the first member 105. (ACT 1215.) For example, the engaging can include activation of the second switch 715 electrically in response to mechanical stimulus by the button 610. For example, the method 1200 can include engaging a second switch 715 disposed at the position at the first member 105. For example, the method 1200 can include engaging, in response to the rotating to the second angle, a second switch 715 disposed at the position at the first member 105.

The method 1200 can include causing the charging device 805 to decouple the charging device 805 and a vehicle 765.

(ACT 1220.) For example, the method 1200 can include causing the charging device 805 to decouple the charging device 805 and a vehicle 765. For example, the second switch 715 can cause a circuit to instruct the charging device 805 or a component thereof to mechanically decouple the charging device 805 and the vehicle 765. For example, the method 1200 can include causing, in response to the engaging the second switch 715, the charging device 805 to mechanically decouple the charging device 805 and a vehicle 765.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a charging coupler having a first member and a second member;
the second member coupled at a first end of the second member with the first member, and the second member configured to rotationally move relative to the first member;
a first switch disposed at the first member and operable to cause, in response to a first movement of the second member rotationally to a first angle with the first member that engages the first switch, a charging device to electrically decouple the charging device from a vehicle; and
a second switch disposed at the first member and operable to cause, in response to a second movement of the second member rotationally to a second angle with the first member that engages the second switch, the charging device to mechanically decouple the charging device from the vehicle.

2. The apparatus of claim 1, comprising:
a second end of the second member configured to rotate toward the first member, the second end of the second member distal to the first end of the second member.

3. The apparatus of claim 1, comprising:
the second member configured to rotate to the first angle and cause the first switch to engage, the second switch being disengaged.

4. The apparatus of claim 1, comprising:
the second member configured to rotate to the second angle and cause the first switch to engage, and causing the second switch to engage.

5. The apparatus of claim 1, comprising:
the first member having a first end configured to mechanically couple with the charging device.

6. The apparatus of claim 1, comprising:
the second member configured to electrically couple with the charging device via the second switch.

7. The apparatus of claim 1, comprising:
a protrusion disposed on the second member and extending in a direction perpendicular to the first member; and
the protrusion moveable, in response to one or more of the first movement or the second movement, to a position at least partially surrounded by a receptacle that defines an opening in the first member.

8. The apparatus of claim 1, comprising:
the second member configured to rotate to the first angle, via a movement of a protrusion disposed on the second member, into a position at least partially surrounded by a receptacle defining an opening in the first member.

9. The apparatus of claim 1, comprising:
the second member configured to rotate to the second angle, via a movement of a protrusion disposed on the second member, into a position at least partially surrounded by a receptacle defining an opening in the first member.

10. A method of operating a charge coupler having a charge controller, the method comprising:
moving a second member, coupled with a first member, to a first angle via a first rotational movement of the second member, the second member coupled at a first end of the second member with the first member, and the second member configured to rotationally move relative to the first member;
engaging, in response to moving the second member to the first angle, a first switch disposed at the first member;
causing, in response to engaging the first switch, a charging device to decouple the charging device from a vehicle;
moving the second member to a second angle via a second rotational movement of the second member;
engaging, in response to moving the second member to the second angle, a second switch disposed at the first member; and
causing, in response to engaging the second switch, the charging device to mechanically decouple the charging device from the vehicle.

11. The method of claim 10, comprising:
attaching, by a coupler at a second end of the first member distal to the first end of the first member, the first member with the charging device.

12. The method of claim 10, comprising:
electrically connecting the vehicle with the charging device.

13. The method of claim 10, comprising:
moving a protrusion to a position at least partially surrounded by a receptacle that defines an opening in the first member, the protrusion disposed on the second member and extending in a direction perpendicular to a length of the second member.

14. The method of claim 10, comprising:
moving a protrusion disposed on the second member into a position at least partially surrounded by a receptacle defining an opening in the first member.

15. The method of claim 10, comprising:

moving a protrusion disposed on the second member into a position at least partially surrounded by a receptacle defining an opening in the first member.

16. A system, comprising:

a charging coupler to connect a charger to a vehicle to deliver power between the charger and the vehicle, the charging coupler comprising:

a latch to lock the charging coupler to the vehicle;

a first member;

a second member coupled at a first end of the second member with the first member, and the second member configured to rotationally move relative to the first member;

a first switch disposed at the first member and operable to cause, in response to a first movement of the second member rotationally to a first angle with the first member that engages the first switch, the charger to electrically decouple the charger from the vehicle; and a second switch disposed at the first member and operable to cause, in response to a second movement of the second member rotationally to a second angle with the first member that engages the second switch, the charger to mechanically decouple the charger from the vehicle.

\*   \*   \*   \*   \*